Sept. 10, 1935.  E. M. KRAMER  2,013,919
BRAKE SIGNALING APPARATUS
Filed June 17, 1933  2 Sheets-Sheet 1
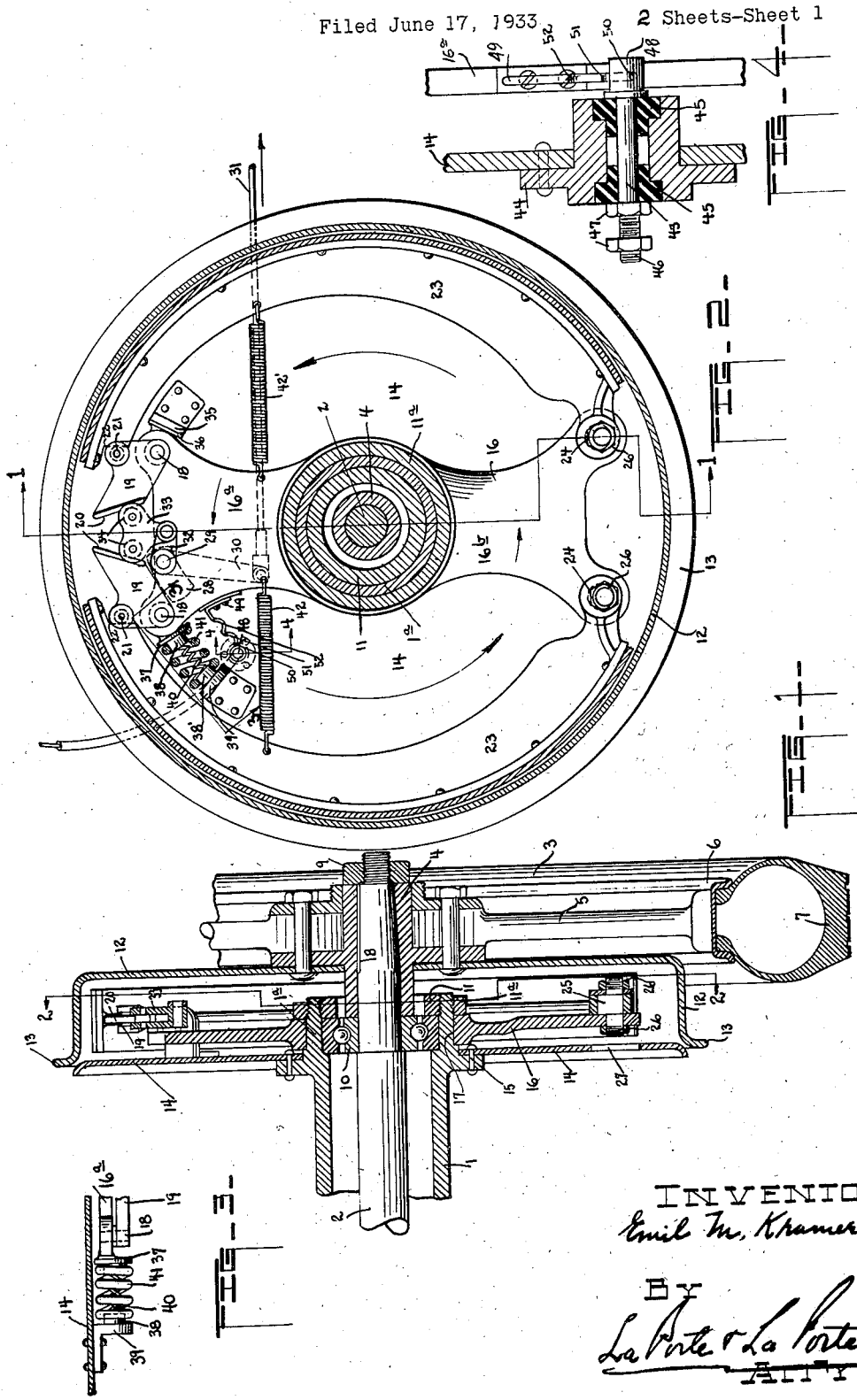
INVENTOR
Emil M. Kramer
BY
LaPorte & LaPorte
ATTYS

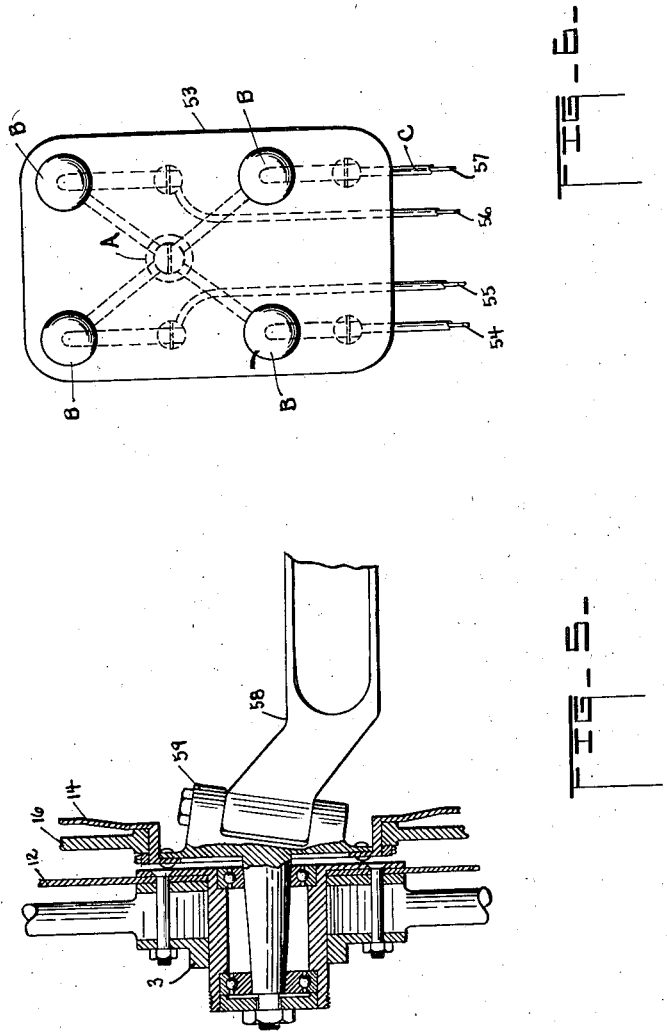

Patented Sept. 10, 1935

2,013,919

UNITED STATES PATENT OFFICE 2,013,919

BRAKE SIGNALING APPARATUS

Emil M. Kramer, Peoria, Ill.

Application June 17, 1933, Serial No. 676,356

8 Claims. (Cl. 177—311)

This invention has reference to automotive brakes and signaling means therefor.

The invention has for its principal object the improvement in automotive brake structures and the provision therewith of a signaling apparatus associated with each brake including a signaling panel preferably located on or near the instrument board of the vehicle, said panel being provided with a signal light for each brake, the panel lights and brake signaling apparatus being suitably connected by electric wiring whereby upon actuation of the brake pedal by the operator of the vehicle, the signaling apparatus of each brake will be caused to function during the application of putting on the brakes to stop or slow down the vehicle and light the respective signal lights in the panel as a warning signal to the operator of the functioning of the brake system of the vehicle.

The present day type of automotive vehicle contains usually not less than four brakes, one for each wheel and in some classes of vehicles of the large passenger and freight carrying type, there are included six and eight brakes when of the six and eight wheel type. In others there are more and less, as will be understood. In vehicles of the multiple brake type, it is a difficult task to adjust the several brakes so that upon actuation of the brake pedal each brake will apply equal braking power and act simultaneously and in unison. Further, when such an adjustment is accomplished, it happens that after use, one or more of the brakes lose their adjustment, becoming loose or tight, as the case may be, and without such a condition becoming immediately known to the operator of the vehicle at the time, the unadjusted condition of the braking system will continue until noticed by reason of severe wear or damage to the vehicle tires and the ineffectiveness of the braking system.

The invention has for a further object the provision of a switch in the signaling apparatus of each brake and so operatively associated therewith to give signals of varying operating conditions of the brake, such signals of varying operating conditions being transmitted by the signal lights in the panel when caused to be operated by the switch, thereby informing the operator of the vehicle the operative condition of each brake in the braking system.

A further object of the invention is the provision of such a switch in the signaling apparatus of each brake which will give a warning signal by lighting its respective signal light in the panel when the brake is dragging, that is, when the operator of the vehicle is not actuating the brake pedal; further, to give a similar warning signal when a light or soft braking power is applied by actuating the brake pedal and finally, to give a third warning signal when a heavy or full brake is applied as that when used for a quick or sudden stopping of the vehicle.

Other and further objects will appear in the following description.

That the invention may be more fully understood, reference is had to the accompanying drawings forming a part of this description and illustrating a preferred embodiment of the invention, in which:

Fig. 1 is a sectional elevation, partly broken away, of a vehicle driving wheel and brake embodying my invention, as the same would appear if taken on the line 1—1 of Fig. 2;

Fig. 2 is a face view of my improved brake as the same would appear if taken on the line 2—2 of Fig. 1;

Fig. 3 is a detail view of the spring elements of the signaling apparatus, as the same would appear if taken on the line 3—3 of Fig. 2;

Fig. 4 is an enlarged detail of the operating switch of the signaling apparatus as the same would appear if taken on the line 4—4 of Fig. 2;

Fig. 5 is a sectional elevation, similar to Fig. 1, illustrating the adaptation of only the supporting elements of my improved brake to a steering wheel of a vehicle, said elements and spokes of the wheel and axle thereof being broken away, and Fig. 6 is a diagrammatic illustration of the signaling panel and wiring for four signal lights for a vehicle having four brakes embodying my invention.

Like characters of reference denote corresponding parts throughout the figures.

Reference being had to the drawings, Figs. 1 and 2 are companion figures and illustrate the embodiment of my invention to the rear wheel of a vehicle, in this case the driving wheel, whereas, Fig. 5 discloses in part the embodiment of my invention to the front wheel of a vehicle or what may be termed the steering wheel.

Referring to Fig. 1, I designates a rear axle housing in which is adapted to rotate the rear axle 2, a wheel 3 comprising the hub 4, spokes 5, rim 6 and tire 7 being suitably keyed to the axle at 8 and locked thereon by means of the usual nut 9. The hub 4 is shown abutting against a roller bearing 10 which supports the axle 2, the keeper ring 11 being interiorly threaded to an extension 1a of the housing 1 for maintaining the bearing 10 in place and alignment. The parts just described are old and well known in automotive construction.

12 designates the brake drum which is rotatively carried by the wheel 3 and is provided with a flange portion 13 at its periphery, the drum being covered by a dirt and water shield 14 which is fixedly secured at 15 to a flange of the axle housing 1.

A brake shoe carrier 16 is rotatively mounted on the exterior surfaces of the extension 1ª of the housing 1 at 17, the outer end of said extension being exteriorly threaded for the threaded securement of a keeper ring 11ª which is adapted to have a bearing engagement with said carrier. Referring to Fig. 2, the carrier is provided with oppositely extending portions comprising an upper reach portion 16ª and a lower reach portion 16ᵇ, said portions being somewhat flared at their respective ends for coaction with the brake shoes.

Pivotally mounted at 18 to the upper flared ends of the upper reach portion 16ª of the carrier are plates 19, their inner meeting faces 20 presenting an inverted V-shaped opening. Rollers 21 are provided in the upper outer portions of said plates and are adapted to have a bearing engagement with a vertical wall 22 comprising the central web of brake shoes 23. The upper ends of the shoes 23 terminate substantially at the rollers 21 of the plates 19, the lower ends thereof being pivotally connected to the lower flared ends of the lower reach portion 16ᵇ as at 24. The connection 24 is an eccentric pin 25, see Fig. 1, the opposite ends of said pin being threaded to receive nuts 26 whereby when it is desired to adjust the brake shoes either tight or loose with respect to the walls of the brake drum 12 will only require the loosening of the nuts 26 and turning the eccentric pin 25 the desired amount. A slotted opening 27 is provided in the wall of the shield 14 in order that an adjusting tool may be fitted to the nut 26.

An arcuately shaped slotted opening 28, see dotted lines in Fig. 2, is provided in the upper wall of the shield 14 through which is adapted to pass a shaft 29 which is pivotally mounted in the upper reach portion 16ª of the carrier preferably between the flared ends thereof, the outer end of said shaft 29 having secured thereto a lever arm 30, shown in dotted lines, which is disposed outside of and preferably next adjacent to the shield 14, the lower end thereof being connected to a brake rod 31 which is adapted to be suitably connected to the brake pedal assembly. The inner end of the shaft 29 is connected by a link 32 to a spreader member 33 having oppositely disposed rollers 34 therein which engage with the inverted V-shaped faces 20 of the plates 19. It will appear obvious that by pulling the brake rod 31 in the direction of the arrow as the result of manipulating the brake pedal of the vehicle, not shown, that the resultant movement of the lever arm 30 will cause the shaft 29 to be pivoted thereby raising the link 32 and spreader 33 which will exert a spreading action upon the faces 20 of the plates 19 by means of the rollers 34 and by means of the rollers 21 of the plates 19 will exert an outward pressure upon the upper ends of the brake shoes and cause the shoes to have a frictional engagement with the inner walls of the brake drum 12. A reverse movement of the brake rod 31 will release the brake shoes and leave the brake drum and attached wheel free for rotative movement.

A stop member 35 of bracket shape is secured to the inside face of the shield 14, the stop member portion thereof acting as an abutting face for a similarly shaped stop member 36 extending from the flared portion 16ª of the carrier 16 whereby a pivotal movement of the carrier 16 in the direction of the member 35 is arrested.

On the other side of the portion 16ª of the carrier and similarly extending from the other flared portion thereof is an abutting member 37 from which face thereof a circular extension 38 protrudes having a welled portion therein. A stop member 39 of similar shape to the member 37 is secured to the inside face of the shield 14, however, considerably lower than its companion member 35 and separated from its coacting member 37 by means of a light gauge helical spring 40, the ends of which are received in the well portions 38 and 38' of the members 37 and 39, respectively. A comparatively heavy gauge helical spring 41 is adapted to encircle the small spring 40 and its opposite ends are adapted to be just short of having a bearing engagement with the faces which extend radially of the well portions of the respective members 37 and 39, see Fig. 2, for reasons to be further discussed. Other helical springs 42 and 42' are provided on opposite sides of the upper portion 16ª of the carrier 16, one each having their opposite ends secured to the central web of the brake shoes 23, as shown.

From the above description, it will be apparent that by reason of the springs 40, 41, 42 and 42' that the carrier 16 will normally have a bearing engagement with the stop member 35.

Referring to Figs. 2 and 4, a signaling switch 30 to be described is closely associated with the dual acting springs 40 and 41.

An electrical conductor rod or pin 43 is positioned through the wall of the shield 14 in a plate 44 suitably connected to said shield wall, said pin being insulated from the plate and shield wall by a suitable non-conductor material 45, the outer end of said pin being threaded as at 46 and having nuts 47 for the securement of a lead in wire, not shown in Fig. 4, however, diagrammatically illustrated in Fig. 2. The inner contact end of said pin is designated 48 and is adapted to coact with the projecting pin 49 which is carried by the upper reach portion 16ª of the carrier 16. The pin 49 is provided with preferably three circuit completing portions 50, 51 and 52. That is, in the movement of the carrier 16 which compresses the springs 40 and 41 to the extent of the portions 38 and 38' substantially abutting, the pin 49 will be moved in a similar path, the circuit portion 50 first momentarily contacting the contact end of pin 48 thereby completing the circuit and causing a signal, and in the further travel of the pin 49 the circuit portion 51 comes into play, and in the further travel of the pin 49 the circuit portion 52 makes the final or third contact and establishing its signal in the electrical circuit.

Reference being had to Fig. 6 a signal panel 53 is illustrated to indicate the grouping and possible arrangement and securement thereto of lead in wires not only from a source of current but to the respective brake signaling apparatus, including the signal bulbs therefor. On the back side of the panel, the source of current may be said to be attached at A having lead wires to each of the signal bulbs B, the lead wires therefrom to the respective brake signaling apparatus being designated C. The arrangement herein shown is illustrative of a signaling panel for a vehicle having a four wheel brake system, the lead wire 54, let us say, having connection to the conductor pin 43 for the left rear wheel brake signaling apparatus, 55 to the left front, 56 to the right front and 57 to the right rear. It shall appear obvious that a signaling panel of any suitable size or arrangement may be provided and may contain more or less signal bulbs than shown, the instant disclosure being merely illustrative of a four wheel brake signaling system.

Fig. 5 is illustrative of similar designated members corresponding to the invention described and shown in Figs. 1 to 4, both inclusive, as applied to a front axle 58 and steering spindle 59.

In the operation of the brake signaling system and referring to Fig. 2, let it be assumed that the forward travel of the wheels 3 of the vehicle be in the direction of the arrows, as indicated.

Assuming the brake structure illustrated in Fig. 2 represents the left rear wheel of the vehicle and is electrically connected to the lead in wire 54, see Fig. 6, of the signaling panel 53.

Further assuming the brake shoes 23 to be out of adjustment and tending to have a frictional contact with the brake drum 12 without the actuation of the brake rod 31, it will be understood that such abnormal braking action upon the revolving wheel will cause the brake shoes to have a traveling action with the wheel and by reason of the connection of the shoes with the loosely mounted carrier 16, said carrier will be pivoted on the extension member 1ª of the housing with said shoes, thereby compressing the small helical spring 40 and simultaneously causing the contact portion 50 of the pin 49 to make contact with the contact pin 48 and thereby completing the circuit and lighting the signal bulb B connected with the lead in wire 54 giving notice to the operator of the vehicle that the brakes of the left rear wheel are dragging and out of adjustment. The adjustment is accomplished as previously described.

Should the brake shoes be considerably out of adjustment, the rotative tendency of the shoes and carrier may be intensified to the extent that the large helical spring will be caused to be compressed, thereby causing the movement of the contact pin 49 to be greater and establish a further contact with the portion 51 and if the gripping action of the brakes be sufficiently out of adjustment, it is possible that the movement of the shoes, carrier and pin 49 will cause the portion 52 thereof to make contact, thus giving three signals to the operator, indicating that the condition of that brake is equal to a fully power applied brake.

When actuating the brake rod 31 by means of the brake pedal and assuming the braking system is in full adjustment, and only a slight braking power is applied to the rod 31, the initial dragging signal, by a contacting of the portion 50, will be first transmitted to the signal light to be immediately followed by another flash of the same signal light by reason of the contacting of the portion 51 of the pin 49 with the contact pin 48 and, as will be understood, the signal light will remain lighted as long as such a slight braking pressure is applied and the portion 51 is in contact with the pin 48. With the braking system in full and perfect adjustment, it will be further understood that the above operation will cause each of the signal bulbs B to flash in unison and remain lighted until the braking power is relieved, thereby giving instant knowledge to the operator of the vehicle of the proper working condition of the brake system.

In the event of applying a full and hard braking pressure upon the brake rod 31 to accomplish a sudden and quick stopping of the vehicle, it will be understood that the third and final signal of the signal bulbs in the signal panel will be given as the result of the portion 52 of the pin 49 contacting the contact pin 48.

When the braking pressure exerted by the actuation of the rod 31 is lifted, it will be understood that the springs 41 and 40 will return the carrier and shoes to their normal inoperative position, as shown, the abutting face 36 abutting the member 35 and by means of the springs 42 and 42′ the shoes will be normally kept out of engagement with the braking walls of the brake drum 12. The signaling system is not capable of operation by a backing up or reverse travel of the wheels 3 of the vehicle, however, the brake system is fully operative in either direction.

What I claim is:

1. A signal for a brake mechanism comprising in combination, a wheel, a brake drum and a brake means arranged for coaction therewith, a movable element, operating means carried by said element adapted to actuate said brake means, said element adapted for movement on the engagement of said brake means with said drum while the drum is turning, means for actuating said operating means, a signal panel provided with a signaling means, a contact member in connection with said signaling means, a plurality of contacts carried by said movable element arranged for successive contact with said contact member upon movement of the movable element and an electrical circuit for energizing said signaling means on the engagement of said aforementioned contacts with said contact member.

2. A signal for a brake mechanism comprising in combination, a wheel, a brake drum and a brake means arranged for coaction therewith, a movable element, operating means carried by said element adapted to actuate said brake means, said element adapted for movement on the engagement of said brake means with said drum while the drum is turning, means for actuating said operating means, a signal panel provided with a signaling means, a contact member in connection with said signaling means, a plurality of contacts carried by said movable element arranged for successive contact with said contact member upon movement of the movable element, an electrical circuit for energizing said signaling means on the engagement of said aforementioned contacts with said contact member, a stop for limiting the movement of said movable element, and resilient means between said movable element and said stop, said resilient means coacting with the successive operation of said plurality of contacts whereby the signal means is successively actuated to denote brake operating conditions.

3. A signal for a brake mechanism comprising in combination, a wheel, a brake drum connected to rotate with said wheel, a support, a brake shoe carrier movable on said support, a plurality of brake shoes arranged for coaction with said drum, said carrier adapted to be moved on the engagement of said brake shoes with said drum while the wheel is turning, one end of each shoe having an adjustable connection with said carrier, operating means between said carrier and said shoes for positively moving the shoes into coaction with said drum, means for imparting movement to said operating means, a signal panel provided with a signaling means, a contact member in connection with said signaling means, a plurality of contacts connected with said carrier arranged for successive contact with said contact member and an electrical circuit for energizing said signaling means on the engagement of said aforementioned contacts with said contact member.

4. A signal for a brake mechanism comprising in combination, a wheel, a brake drum connected to rotate with said wheel, a support, a brake shoe carrier movable on said support, a plurality of brake shoes arranged for coaction with said drum, said carrier adapted to be moved on the engagement of said brake shoes with said drum while the drum is turning, one end of each shoe having an adjustable connection with said carrier, operating means between said carrier and said shoes for positively moving the shoes into coaction with said drum, means for imparting movement to said operating means, a signal panel provided with a signaling means, a contact member in connection with said signaling means, a plurality of contacts connected with said carrier arranged for successive contact with said contact member upon movement of the carrier, an electrical circuit for energizing said signaling means on the engagement of said aforementioned contacts with said contact member, a stop for limiting the movement of said carrier, and resilient means between said carrier and said stop, said resilient means coacting with the successive operation of said plurality of contacts whereby the signal means is successively actuated to denote brake operating conditions.

5. A signal means for a brake mechanism comprising in combination, a wheel, a brake drum and brake means arranged for coaction therewith, a movable element, operating means associated with said element adapted to actuate said brake means, said element adapted for movement on the engagement of said brake means with said drum while the drum is turning, means for actuating said operating means, a signal panel provided with a signaling means, a signaling member in connection with said signaling means, a plurality of signaling members associated with said movable element adapted for successive coaction with said signaling member upon movement of the movable element, and means for actuating said signaling means on coaction of said aforementioned signaling members with said panel signaling member.

6. A signal means for a brake mechanism comprising in combination, a wheel, a brake drum and brake means adapted for coaction therewith, a movable element, operating means associated with said element adapted to actuate said brake means, said element adapted for movement on the engagement of said brake means with said drum while the drum is turning, means for actuating said operating means, a signal panel provided with a brake signaling means, signaling operating means connecting said signaling means and said movable element whereby upon actuation of said operating means, the resultant movement of said element on the engagement of said brake means with said drum actuates said signaling operating means connecting said signaling means and said element and actuates the signaling means to denote brake operating conditions.

7. A signal means for a brake mechanism comprising in combination, a wheel, a brake drum and brake means arranged for coaction therewith, a signaling means, a contact member in connection with said signaling means, a contact member associated with said brake means adapted to be moved into engagement with said first mentioned contact member, an electrical circuit embodying said contacts and said signaling means, means actuated by said brake means when the latter are in engagement with the drum when rotating for moving said last mentioned contact member into engagement with said first mentioned contact member whereby said signaling means is actuated to denote brake operating conditions.

8. A signal means for a brake mechanism comprising in combination, a wheel, a brake drum and brake means arranged for coaction therewith, a signaling means, a stationary contact member in connection with said signaling means, a plurality of movable contact members associated with said brake means adapted to be moved into successive engagement with said stationary contact member, an electrical circuit embodying said contact members and said signaling means, means actuated by said brake means when the latter are in engagement with the drum when rotating for moving said movable contacts into successive engagement with said stationary contact member whereby said signaling means is successively actuated to denote brake operating conditions.

EMIL M. KRAMER.